Aug. 23, 1960 C. D. BERGER 2,949,881
TEMPERATURE-COMPENSATING INDICATORS
Filed June 28, 1956 2 Sheets-Sheet 2

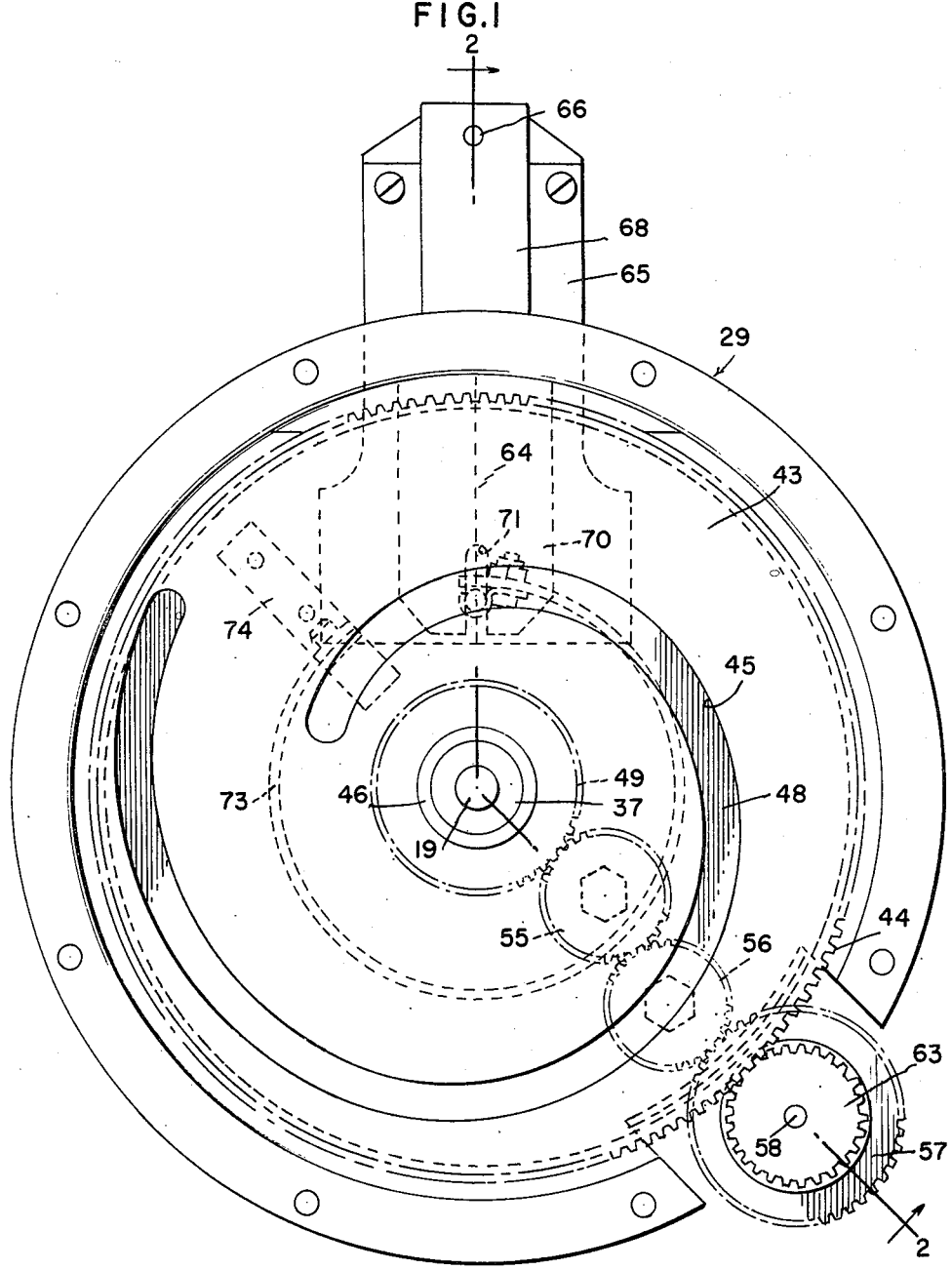

Inventor
Christian D. Berger
By Ralph B. Stewart
ATTY.

United States Patent Office 2,949,881
Patented Aug. 23, 1960

2,949,881

TEMPERATURE-COMPENSATING INDICATORS

Christian D. Berger, New York, N.Y., assignor to Polytechnic Research & Development Co., Inc., Brooklyn, N.Y., a corporation of New York Filed June 28, 1956, Ser. No. 594,487

6 Claims. (Cl. 116—129)

This invention relates to improvements in temperature-compensating indicators for measuring instruments, and more particularly to temperature-compensating indicators for electric wave meters.

Heretofore, the methods used for temperature compensation, particularly with frequency meters, has been exact at only one frequency, with the result that considerable errors occur at the ends of the tuning range or at least those portions of the range which are remote from that frequency which is exact. In meters having linear adjustment, external means of compensation may be used to reduce such errors, but when the range of the instrument is very large, the errors at the extreme frequencies are still too great; and in instruments or meter shaving nonlinear characteristics, the errors are often not tolerable where precision is required.

It is an object of this invention, therefore, to provide a new and improved temperature-compensating indicator for electric wave meters.

Another object of this invention is to provide a temperature-compensating indicator utilizing a spiral scale in conjunction with an index line wherein the index line is movable with respect to the scale about some point (not necessarily fixed) spaced from the center of the spiral scale, and to control the movement of the index line in accordance with temperature variations so as to compensate for errors due to temperature changes over the entire range of the instrument or to minimize such errors.

A preferred form of the invention is shown in the accompanying drawing in which:

Figure 1 is a front elevational view of a reaction type of wave meter embodying an indicator according to this invention;

Figure 2:
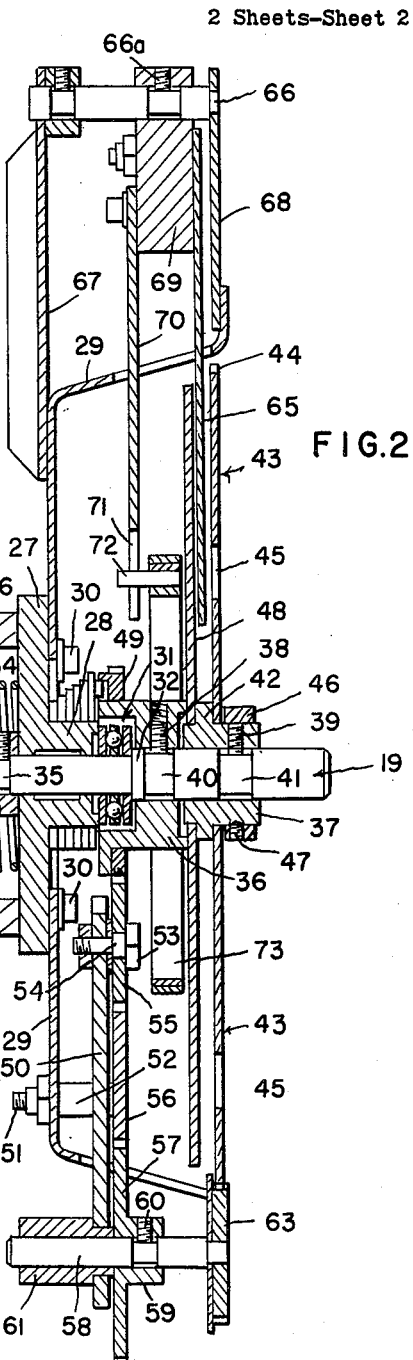
Figure 2 is a section taken along the plane of section line 2—2 in Figure 1.

Referring to Figure 2, numeral 10 indicates a housing which is provided with a partition wall 11 dividing the interior of the housing into two sections, 12 and 13. The section 12 is provided with an end wall cover member 14 to seal off the section which forms the resonant cavity of the meter. A movable piston 15 located in the cavity varies the volume between the piston face and the end wall 14 and thereby varies the resonant frequency of the cavity which is coupled to a wave-guide 16 through a coupling slot 12a which is suitably sealed to be air-tight. By varying the position of piston 15, the cavity may be tuned to the wave energy being transmitted in wave-guide 16. It will be understood that the usual resonance indicator will be provided at a suitable point in the wave-guide system.

The piston is secured to one end 17 of an internally threaded nut member which projects through the partition wall 11 and is slidable therethrough. Preferably, a bushing member 18 is fitted within the partition wall to guide the nut member 17. The member 17 is moved axially back and forth in accordance with the rotation of the tuning shaft 19 which is externally threaded over its portion 20 for threaded engagement with nut 17.

At the end of the nut opposite the piston is an enlarged head or shoulder 21 which has one end of the bellows 22 sealed thereto, the opposite end of the bellows being secured to the opposing face of the partition wall 11. The purpose of this construction is to seal off the section 12 from the section 13 and suitable breathing holes 23 may be provided through the partition wall surrounding bushing 18 and connecting the interior of the bellows 22 with the section 12. Preferably, section 12 forming the resonant cavity is heated and evacuated at 90° C. for four hours, after which the space is filled with dry nitrogen and evacuated to a pressure of 2 microns before being sealed off.

To avoid errors which may be caused by play between the threaded portion 20 of the shaft 19 and the nut 17 to which the piston is attached, and to compensate for any axial shifting of the shaft 19, the previously mentioned collar 21 of the nut has a cup 24 seated thereon and which is provided with an annular flange 25 which serves as a seat for a coil spring 26 engaged at its opposite end against the inner face of the end wall member 27.

The end wall 27 is provided with a centrally located hub 28 which journals the tuning shaft 19. Surrounding the hub 28 is a generally dish-shaped body or frame 29 supported on the outer face of the member 27 by suitable fasteners 30. A thrust bearing 31 surrounds the shaft 19 between the outer face of the hub 28 and a shoulder portion 32 on the shaft and limits axial movement of the shaft in one direction, whereas axial movement of the shaft in the opposite direction is limited by the thrust collar member 33 disposed within the housing section 13 and engaging the inner face of the wall 27. The thrust collar 33 may be fixed in place by a suitable setscrew 34 engaging within the groove 35 in the shaft 19.

Also fixed for rotation with the shaft 19 are a pair of collars 36 and 37, each of which is fixed to the shaft by a setscrew, as shown at 38 and 39, respectively, operating in the shaft grooves 40 and 41. The collar 37 is provided with a radial flange 42 intermediate its ends and on the portion of this collar outwardly of such flange is journaled a window member 43 which, as shown most clearly in Figure 1, is a circular disk and is provided with peripheral teeth 44 and with a spiral slot 45. Preferably, the disk 43 is opaque. A stop collar 46 is mounted by a suitable setscrew 47 on the collar 37 and a slight clearance is provided between the collar 46 and the window disk 43 to permit the window to rotate freely upon the collar 37 for a purpose which will be presently apparent.

A dial disk 48 is staked to the rear end portion of the collar 37 and is held against the shoulder 42 on this collar. The collar 36 carries a drive gear 49 rigidly secured thereto so that it rotates in unison with the tuning shaft 19.

A carrier plate 50 is rigidly secured to the body 29 as by fasteners 51 and is held in proper spaced relationship thereto by spacer elements 52. Plate 50 supports one end of a bolt or stub shaft 53 having an enlarged shoulder portion 54 on which is journalled an idler gear 55 which meshes with the drive gear 49 and with a further idler gear 56 also suitably journaled on the carrier 50 and which in turn meshes with the external gear 57 mounted on the axle 58 (see Fig. 1), the gear 57 being provided with a hub 59 fixed to the axle 58 by means of the setscrew 60. The axle 58 is journalled at one end in a sleeve bearing 61 mounted on plate 50. The opposite end of the axle 58 carries gear 63 which is in mesh with the circumferential teeth 44 on the window disk 43.

From the above, it will be clear that when the shaft 19 is rotated, the piston 15 will be correspondingly shifted within the housing section 12 to diminish or increase the volume of the cavity and thereby vary the resonant frequency of the cavity. At the same time the dial disk 48 which carries a spiral scale on its outer face will be rotated with the shaft, and the drive gear 49 will, through the medium of the intermediate gears 55, 56, 57 and 63, impart a corresponding rotation to the window member 43, although it is to be understood that the rotational speed of the window will be very much slower than the rotational speed of the tuning shaft. The scale on the face of the disk 48 is preferably constructed as a multi-turn spiral and the gear ratio between the tuning shaft 19 and the window 43 is such as to rotate the window at such a speed that successive turns of the spiral will be displayed through the spiral window 45 at the indexing point as hereinafter described, as the tuning shaft is rotated, and to this end, it will be obvious that whereas the tuning shaft may rotate throughout the range of the instrument in as many times as there are turns of the spiral scale, the window will only rotate approximately one revolution throughout such range. The multi-turn dial with the spiral window disk is being claimed in my copending application Serial No. 529,057 filed August 17, 1955.

The reading of the scale is accomplished at the point of the visual intersection between the index line 64 and that turn of the multi-turn spiral scale which is visible at this point through the window slot 45, the index line being scored or provided on the transparent index member 65 which member overlies the dial 48 and is disposed between the outer face of the dial and the window member 43. The index member 65 is pivotally suspended about a pivot shaft 66 which is carried by suitable bearing bracket members 67 and 68 secured to the body 29, the index 65 being secured directly to a block 69 which is fixed to the pivot shaft 66 as by a setscrew 66a and which also carries a depending compensating arm 70 which is provided at its lower end with an axially extending notch 71 within which a pin or key 72 is received. The pin 72 is fixed to one end of a generally C-shaped temperature compensating bimetallic element 73, the opposite end of the element 73 being fixed to the body 29 by means of a suitable bracket 74. The compensating element will flex in response to temperature changes so that the pin 72 operating within the slot 71 will swing the compensating arm 70 and consequently the index member 65 about the axis of pivot shaft 66, thus shifting the point of visual intersection between the index line 64 and the portion of the spiral scale visible through the window 45 in accordance with the operating temperature.

The index is pivoted about a point removed from the center of dial rotation, and when so moved relative to the spiral scale, different angular amounts of dial compensation are achieved at different portions of the spiral. It is thus possible to provide compensation over the entire frequency range. As explained in my co-pending application Serial No. 590,168, now Patent No. 2,912,957, entitled "Interpolating Indicators," filed June 8, 1956, swinging of the index line to one side or the other of the line passing through the dial axis and the pivot axis of the index member has the effect of increasing or decreasing the length of the spiral scale, depending on the direction of swing.

The spiral scale may be formed as an Archimedes' spiral or it may assume other forms.

Figure 3:
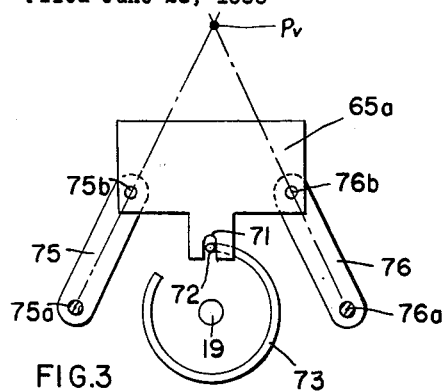
Figure 3 is a diagrammatic view showing a modified arrangement for supporting the index plate to turn about a virtual pivot point.

The index plate may be mounted to swing about a virtual pivot point which may need not necessarily be stationary or fixed. Figure 3 shows an arrangement in which the index plate 65a is supported upon a pair of links 75 and 76 pivoted at their lower ends to fixed pivot 75a and 76a, preferably equally spaced on opposite sides of the shaft 19. Fixed pivots 75a and 76a are formed on a suitable support carried by frame 29. The upper ends of links 75 and 76 are pivotally connected to the plate 65a at 75b and 76b, respectively. With this arrangement, the plate 65a is supported to swing about a virtual pivot Pv located above the plate and at the intersection of the axes of the two links 75 and 76. This pivot point does not remain stationary but shifts with different angular positions of the two links. The free end of the temperature-responsive element 73 is connected with the index plate 65a by the pin 72 extending laterally from the free end of the element 73 and into the slot 71 formed in a lower portion of the plate 65a.

Figure 4:
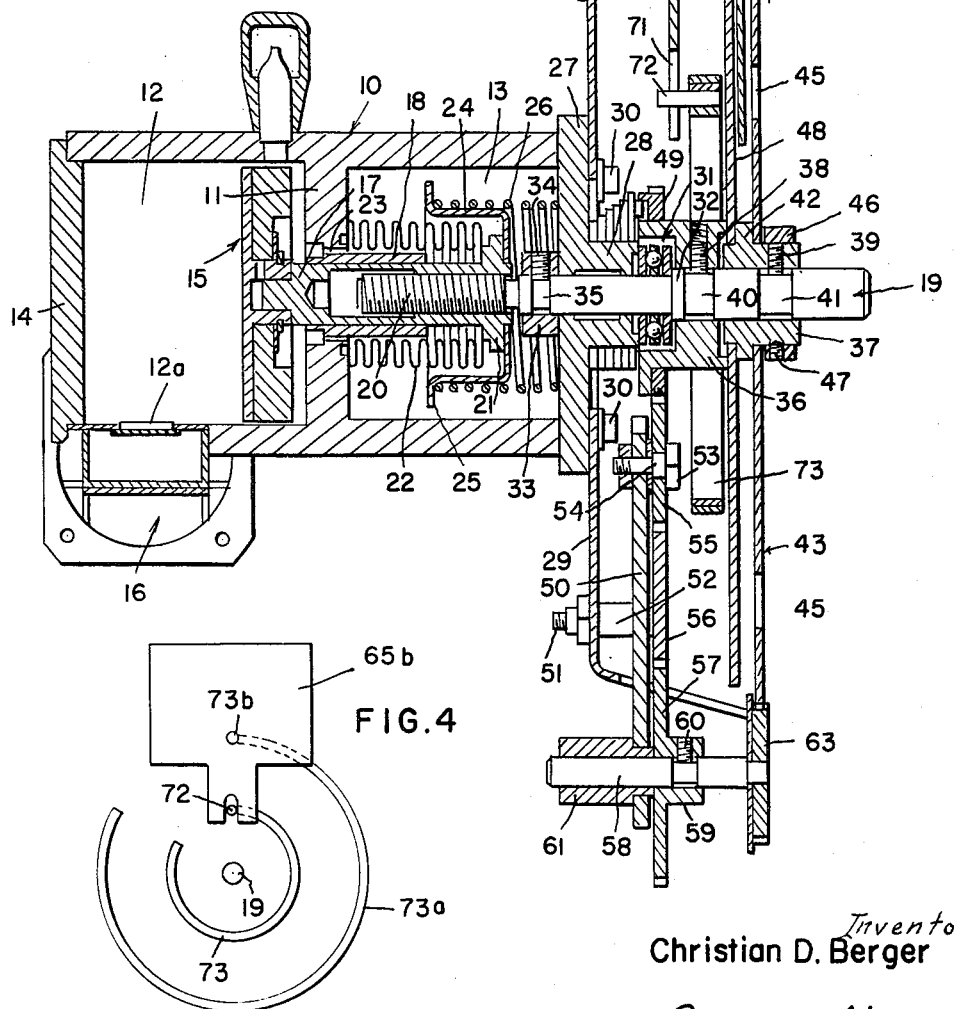
Figure 4 is a diagrammatic view of another embodiment using two temperature-sensitive elements.

Figure 4 shows an arrangement for mounting the index plate 65b so that its swinging movement is controlled by the differential action of two temperature-responsive elements. One temperature-responsive element 73 is connected to the plate 62b in the same manner as the element 73 is connected to the plate 65a in Figure 3. A second temperature-responsive element 73a is provided at its free end with a laterally extending pin 73b on which the plate 65b is pivotally mounted at a point located directly above the pin 72 supported on the free end of the element 73. When the two elements 73 and 73a have different temperature-responsive characteristics, the plate 65a will tilt about a virtual pivot point.

I claim:

1. An indicator for a measuring instrument comprising, a supporting frame having a scale movably mounted thereon, a device adjusting member, the scale being movable by said member, an index member movably mounted on said frame and having an index line thereon arranged to intersect the scale at different points on the scale as the scale is moved to indicate the adjustment of the device, and a temperature-responsive means operatively connected to the index member for moving the index member to shift the point of visual intersection between the index line and the scale in accordance with temperature variations.

2. An indicator for a measuring instrument comprising, a rotatable disk having a spiral scale on one face thereof, a device adjusting member, means operated by the member for moving the scale, a transparent index member overlying said one face and having an index line thereon for visually intersecting the scale at different points on the scale as the disk is rotated to indicate the adjustment of the device, means mounting said index member for swinging movement about an axis parallel to and displaced from the axis of rotation of the disk, and temperature-responsive means operatively connected to the index member for swinging said index member about said pivotal axis in accordance with temperature variations.

3. An indicator according to claim 2 wherein the axis for said index member is fixed with respect to the axis of said shaft.

4. In a measuring device, a supporting frame, a shaft mounted upon said frame and being rotatable in accordance with a condition to be measured, a disk mounted for rotation with said shaft and having a spiral scale on one face thereof, index means mounted upon said frame and presenting a line for visual intersection with the spiral scale at different points on the scale as the shaft and disk are rotated, means supporting said index means to swing about an axis parallel to and displaced from the axis of said shaft, and temperature-responsive means operatively connected to the index means for swinging said index means about said axis.

5. An indicator as in claim 1, and including means mounting the index member to be moved by said temperature-responsive means comprising, a pair of equal length link members pivoted at one end to the index member and at their other ends to fixed pivots.

6. An indicator as in claim 1, in which the temperature-responsive means comprises two bimetallic C-shaped members each having one end secured to a fixed support, a lateral extension on the free end of one bimetallic member for pivotally supporting the index member, the free end of the other bimetallic member being pivotally connected to the index member at a point spaced from said lateral extension, the bimetallic elements having different temperature-responsive characteristics.

References Cited in the file of this patent

UNITED STATES PATENTS

| | | |
|---|---|---|
| 1,760,291 | Thomas | May 27, 1930 |
| 2,027,875 | Odend'Hal | Jan. 14, 1936 |
| 2,379,328 | Weingart | June 26, 1945 |
| 2,388,027 | Weil | Oct. 30, 1945 |
| 2,552,828 | Westover | May 15, 1951 |
| 2,575,856 | Ware | Nov. 20, 1951 |